United States Patent Office 3,537,966
Patented Nov. 3, 1970

3,537,966
RADIATION TREATMENT OF MINE WASTE WATERS
Meyer Steinberg, Huntington Station, and Jacob Pruzansky, East Islip, N.Y., assignors to the United States of America as represented by the United States Atomic Energy Commission
No Drawing. Filed Nov. 3, 1967, Ser. No. 680,351
Int. Cl. B01j 1/10
U.S. Cl. 204—157.1                                  3 Claims

ABSTRACT OF THE DISCLOSURE

A method of removing dissolved iron oxides from acidic aqueous solutions comprising exposing the aqueous solution to gamma irradiation while aerating and contacting the solution with calcium carbonate to induce precipitation of the contained iron oxides from the solution.

PRIOR ART

Ferric oxide in coal mine water wastes is one of the chief factors causing unsightly pollution of streams and rivers in many states. Others in the art have proposed the use of gamma irradiation to change the ferrous iron to ferric iron by a chain reaction in an acid media. However, while attempting cobalt[60] gamma irradiation of mine drainage solution having a low pH range i.e., pH's ranging from 4.2 to 0.1, it was found that the G-value for oxidation of ferrous oxides to ferric oxides varied from about 15 to about 70 depending on intensity (in the range of 10,000 to 100,000 rads/hr.) and the yield was not significantly affected by the addition of organic reagents, i.e., formic acid or by aeration of the water during irradiation. More important, from a process point of view, was that even when long term intensive irradiation was employed, it was not possible to oxidize and remove the iron oxides below a concentration of about 50 p.p.m. when starting with a concentration of 765 p.p.m.

It is an object of this invention to provide an efficient, economical method of removing iron oxides from aqueous solutions.

SUMMARY OF THE INVENTION

The invention described herein was made in the course of, or under a contract with the U.S. Atomic Energy Commission.

A process for treating acidic aqueous solutions containing ferrous iron compounds dissolved therein in order to remove the ferrous iron compounds from the solution comprising, exposing an acidic aqeuous solution containing ferrous iron compounds dissolved therein and having a pH below 6.0 to an ionizing irradiation field having an intensity of a least 1000 rads per hour while aerating said solution until substantially all of the ferrous iron compounds are converted to ferric iron compounds, contacting the ferric iron compounds in the solution with calcium carbonate to form and precipitate ferric oxide out of the aqueous solution.

DETAILED DESCRIPTION OF THE INVENTION

The process disclosed herein is especially useful in treating acidic mine waste water which have soluble ferrous iron compounds contained therein. This process will remove substantially all ferrous iron compounds from the aqueous solution. Exemplary of ferrous iron compounds which can readily be removed from aqueous solutions are ferrous sulfate, ferrous bicarbonate, ferrous chloride, etc. When the process is employed the ferrous iron compound concentration can efficiently and economically be lowered from the saturation point to under 6 p.p.m.

While the steps of irradiation and aeration of the solution must be performed simultaneously with each other, the calcium carbonate can be added to the solution prior to, during or after the irradiation and aeration of the solution. In the preferred embodiment of the invention, the ferric iron compounds are contacted with calcium carbonate both for process efficiency and economic reasons. Any type of radiation can be used in our normal process provided it is an ionizing radiation having sufficient energy to penetrate the aqueous solution and to raise the ferrous iron compounds to the higher oxidation state of ferric iron compounds contained in the solution. Exemplary of the type radiation found usable in our invention are electron beams, proton beams, X-rays and gamma rays. The selection of a particular type and amount of radiation will, of course, in a large measure be dependent on the type and shape of reactor vessel employed, source economics and availability, the amount of solution and degree of pollution contained therein. The use of such radiation means and the hazards connected therewith are well known to those skilled in the art. The rate of conversion of ferrous compounds to ferric compound is proportional to the field strength of the irradiation used. Use of a field strength below 1000 rads/hr. is inefficient and uneconomic.

The temperature of the solution to be treated can range from the solution melting point to its boiling point. However, from a practical economic standpoint we have found that solution temperatures ranging from between 10° C. to about 25° C. are adequate. As higher solution temperatures are used the reactions proceed more swiftly, however, when large volumes are to be treated higher temperatures adversely affect process economics.

The amount of aeration required will of course depend on the amount of ferrous compounds in the solution and the intensity at which both aeration and radiation is carried out. We have found that an aeration rate of 300 cc. per min. per 500 cc. of liquid containing over 500 p.p.m. ferrous compounds is more than adequate.

The amount of calcium carbonate to be added to the solution should be adequate to raise the pH of the solution to a pH of about 6.0. The calcium carbonate may be added as a fine powder. However, the particular form of the calcium carbonate is not to be construed as a limitation on our invention as it can be in any form or shape in which there can be adequate contact between the solution and the calcium carbonate.

EXAMPLE

The following example showing a series of individual runs are given to illustrate the beneficial effects achieved by our novel process.

Naural mine drainage water was used for the example, since it is highly variable and contains many constitutents which are not easily analyzable and thus not easily simulated. An initial batch of acid mine drainage water from an abandoned Pennsylvania mine was obtained in polyethylene lined steel drums. The initial $Fe^{++}$ compositions and pH are listed in the second and third column in the table.

Approximately 100–200 cc. batches were uesd for each experiment and these were spilit so that one-half acted as a control while the other was being treated. Analysis was made only for $Fe^{++}$ in solution using standard dichromate titration methods. The solutions were allowed to settle and the supernate was pipetted out. No attempt was made to perform a filtration prior to analysis.

Reagent grade powdered limestone (99.5% $CaCO_3$) was used for the neutralization. The pH was measured by a calomel electrode coupled to a pH meter. During an experiment, agitation and aeration was provided by a glass frit bubbler and the experiment was carried out in a 500 cc. gas bubbling wash bottle. The air flow was measured with a rotameter during both the neutralization and irradiation periods. Time between limestone treatment and irradiation was ≈20 minutes and a settling time for each analysis of ≈ 30 minutes was allowed.

The irradiations were performed in a tank-type $Co^{60}$ gamma facility. The fritted glass wash bottle and the attached entrance and exit air tubing were lowered ≈ 12 ft. down into the irradiation tube of the facility. The air flow from a high pressure gas cylinder was then started and regulated throughout the experiment. The $Co^{60}$ gamma sources in two supporting cages were moved manually with long manipulators to predetermined positions around the irradiation tube to provide the previously calibrated $Co^{60}$ gamma field. After the timed period of irradiation was completed, the wash bottle was removed and the contents analyzed as described above.

Experimental results and discussion

The table gives the results showing pH and $Fe^{++}$ content before and after limestoning, and compares the results with those obtained in the presence of a radiation field. Two intensity fields of 0.02 and 4.3 megarads/hr. were used. The higher intensity field gave the shortest oxidation and precipitation time, while the lowest intensity gave the highest radiation yield.

The aeration rate was fairly vigorous and was kept constant at 300 cc./min. The table essentially gives the data for a comparison between $CaCO_3$ treatment and $CaCO_3$ plus radiation treatment. The rate, Q, is expressed in p.p.m. of $Fe^{++}$ oxidized per minute calculated from time zero after initial addition of $CaCO_3$. The G-value is based on the following expression taking into account the proper conversion factors.

$$\text{G-value} = 1.04 \frac{\Delta \text{ p.p.m.}/\Delta t}{\text{Mrad/hr.}} = 1.04 \frac{R}{I}$$

G-value = molecules (or atoms) of $Fe^{++}$ oxidized to $Fe^{+++}$ solution per 100 ev. of radiation energy deposited in solution, Δp.p.m. = change in $Fe^{++}$ concentration after time zero addition of limestone as determined by dichromate titration Δt = time or irradiation, min.

Q = rate of $Fe^{++}$ removal in Δp.p.m./Δt

I = intensity of $Co^{60}$ gaam field in Mrad/hr.

Based on the above results with only two intensities, the following rate and G-value table, and equations can be derived.

TABLE 1.—MINE DRAINAGE WASTE

[$CaCO_3$ treatment followed by $Co_{60}$ gamma irradiation: aeration rate, 300 cc./min.: temperature=22° C.]

| Exp. series | Initial solution | | $CaCO_3$ treatment | | | Q rate Δp.p.m./min. | Irradiation treatment | | Final conc., p.p.m. | Q rate, >p.p.m./min. | G-value ($Fe^{++}-Fe^{+++}$) |
|---|---|---|---|---|---|---|---|---|---|---|---|
| | $Fe^{++}$ conc., p.p.m. | pH | $Fe^{++}$ conc., p.p.m. | pH | Time, min. | | I intensity, megaards/hr. | Time, min. | | | |
| A | 409 | 3.0 | 350 | 5.7 | 0 | | 0.02 | 0 | 350 | | |
| | 409 | 3.0 | 314 | 5.7 | 60 | 0.60 | 0.02 | 60 | 241 | 1.82 | 95 |
| | 409 | 3.0 | 130 | 5.7 | 120 | 1.84 | 0.02 | 120 | 8 | 2.85 | 148 |
| | 409 | 3.0 | 8 | 5.7 | 240 | 1.43 | 0.02 | 240 | <1 | 1.46 | 76 |
| B | 274 | 2.7 | 262 | 5.7 | 0 | | 4.3 | 0 | 262 | | |
| | 274 | 2.7 | 225 | 5.7 | 3 | 12.3 | 4.3 | 3 | 112 | 50.0 | 12.3 |
| | 274 | 2.7 | 212 | 5.7 | 6 | 8.3 | 4.3 | 6 | 1.9 | 43.5 | 10.6 |
| | 274 | 2.7 | 203 | 5.7 | 9 | 6.6 | 4.3 | 9 | <0.8 | 29.2 | 7.1 |
| | | | 24-hr. interruption | | | | | | | | |
| | 274 | 2.7 | 168 | 5.7 | 15 | 6.3 | | | | | |
| | 274 | 2.7 | 173 | 5.7 | 30 | 3.0 | | | | | |
| | 274 | 2.7 | 164 | 5.7 | 45 | 2.2 | | | | | |
| | 274 | 2.7 | 161 | 5.7 | 60 | 1.7 | | | | | |
| | 274 | 2.7 | 5.5 | 5.7 | 810 | 0.3 | | | | | |
| C | 240 | 2.6 | 173 | 5.8 | 0 | | 4.3 | 0 | 173 | | |
| | 240 | 2.6 | 139 | 5.8 | 2 | 17.0 | 4.3 | 2 | 83 | 45.0 | 10.9 |
| D | 409 | 2.6 | 89 | 5.7 | 0 | | | | | | |
| | 409 | 2.6 | 70 | 5.7 | 2 | 9.5 | | | | | |
| | 409 | 2.6 | 39 | 5.7 | 5 | 10.0 | | | | | |
| | 409 | 2.6 | 22 | 5.7 | 15 | 4.5 | | | | | |
| | 409 | 2.6 | 11 | 5.7 | 45 | 1.7 | | | | | |
| | 409 | 2.6 | 8 | 5.7 | 60 | 1.4 | | | | | |
| | 409 | 2.6 | 3 | 5.7 | 120 | 0.7 | | | | | |

From the example it will be obvious to those skilled in the art that our invention provides an efficient, economical method of removing ferrous compounds from acidic aqueous solutions such as mine drainage wastes. Conventional nuclear and chemical engineering techniques and equipment can be employed to carry out the practice of the invention.

We claim:

1. A process for treating acidic aqueous solutions containing ferrous iron compounds dissolved therein in order to remove the ferrous iron compounds from the solution comprising:
    (a) exposing an acidic aqueous solution containing ferrous iron compounds dissolved therein and having a pH below 6.0 to an ionizing irradiation field having an intensity of at least 1000 rads per hour while aerating said solution until substantially all of the ferrous iron compounds are converted to ferric iron compounds;
    (b) contacting the ferric iron compounds in the solution with calcium carbonate to form and precipitate ferric oxide out of the aqueous solution.

2. The process of claim 1 wherein said acidic aqueous solution is mine waste water.

3. The process of claim 2 wherein calcium carbonate is dispersed in the solution during the irradiation of the solution.

References Cited

UNITED STATES PATENTS 3,347,787  10/1967  Rhodes _____ 23—200

OTHER REFERENCES

Hoak et al., Industrial & Engineering Chemistry, vol. 40, No. 11 (November 1948) pp. 2062–67.

Fricke, Report NP3237, Army Chemical Center, Md. (September 1950), paper 3, pp. 24 & 40–43, 45.

HOWARD S. WILLIAMS, Primary Examiner

U.S. Cl. X.R.

23—200